United States Patent
Frohnhaus et al.

(12)

(10) Patent No.: US 6,299,252 B1
(45) Date of Patent: Oct. 9, 2001

(54) UNDERFRAME OF A MOTOR VEHICLE SEAT

(75) Inventors: Ernst-Reiner Frohnhaus; Burckhard Becker, both of Solingen; Wilfried Beneker, Leichlingen, all of (DE)

(73) Assignee: C. Rob. Hammerstein GmbH & Co KG, Solingen (DE)

( * ) Notice: Subject to any disclaimer, the term of this patent is extended or adjusted under 35 U.S.C. 154(b) by 0 days.

(21) Appl. No.: 09/251,548

(22) Filed: Feb. 17, 1999

(30) Foreign Application Priority Data

Feb. 27, 1998 (DE) ............................................. 198 08 397

(51) Int. Cl.[7] ........................................................ A47C 1/02
(52) U.S. Cl. ................... 297/338; 297/344.15; 297/473; 248/419; 248/420
(58) Field of Search ..................................... 297/473, 468, 297/338, 344.17, 344.15; 248/419, 420

(56) References Cited

U.S. PATENT DOCUMENTS

| 3,700,203 | * | 10/1972 | Adams ................................. 248/419 |
| 4,790,597 | * | 12/1988 | Bauer et al. ...................... 297/473 X |
| 5,125,611 | * | 6/1992 | Cox ................................... 248/420 X |
| 5,226,697 | * | 7/1993 | Borlinghaus et al. ........... 297/473 X |
| 5,662,367 | * | 9/1997 | Rastetter et al. ............ 297/344.15 X |
| 5,782,533 | * | 7/1998 | Fischer et al. ........................ 297/338 |
| 5,785,387 | * | 7/1998 | Hernandez et al. .................. 297/473 |

* cited by examiner

*Primary Examiner*—Laurie K. Cranmer
(74) *Attorney, Agent, or Firm*—John Lezdey & Assoc

(57) ABSTRACT

Motor vehicle seats with safety belts wherein the free end of the lap belt is attached to an outer rocker located on the vehicle exterior side. The arrangement provides an improved distribution of forces in the event of an accident.

8 Claims, 4 Drawing Sheets

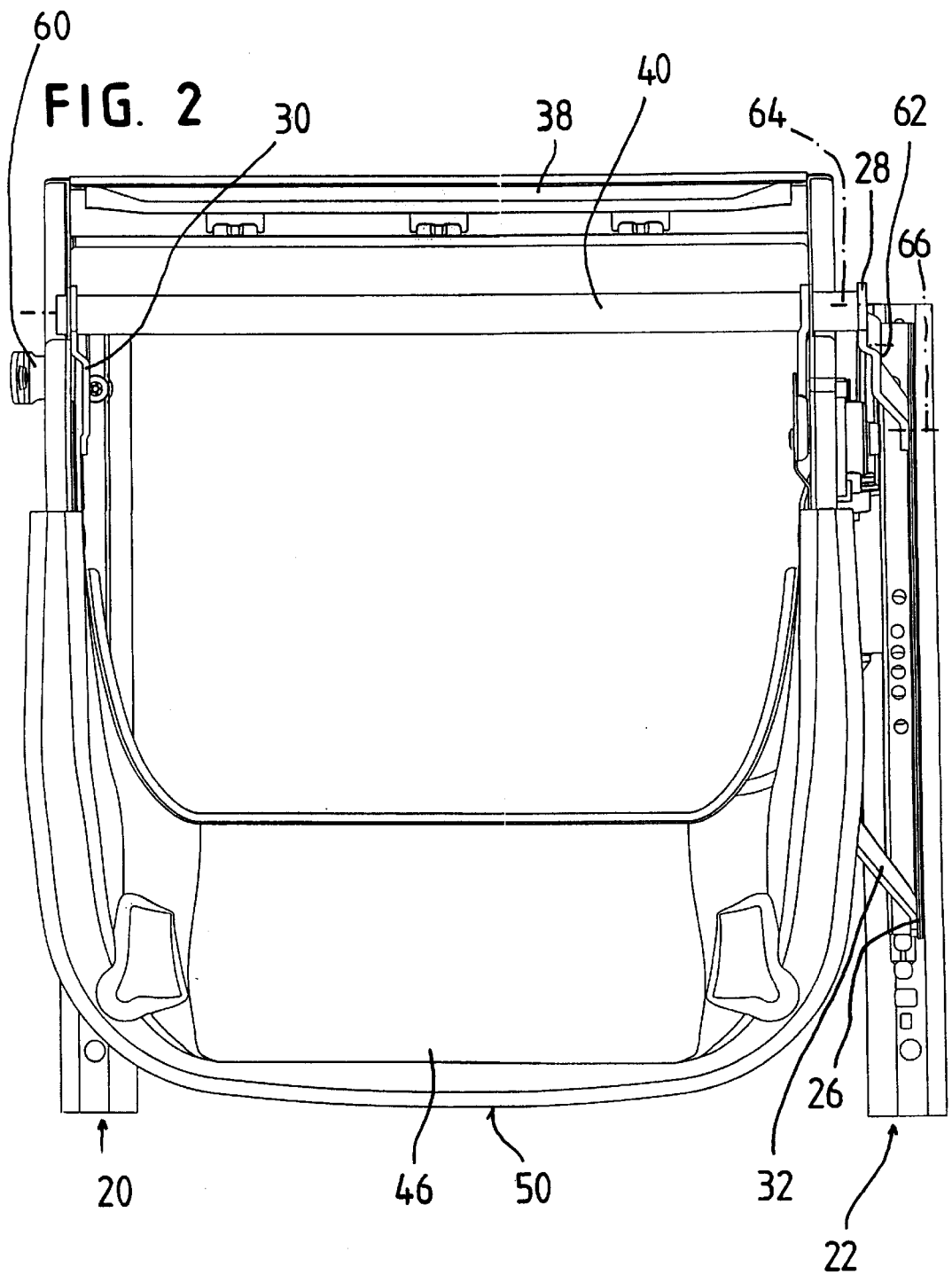

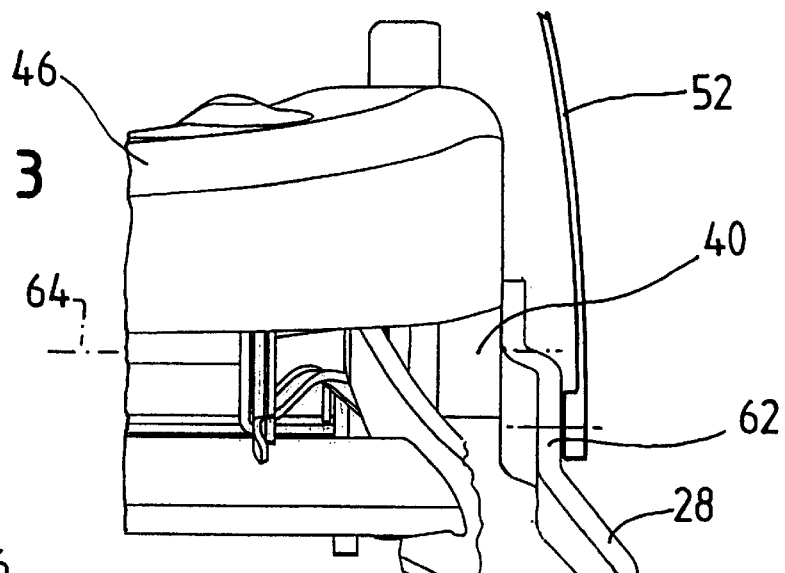
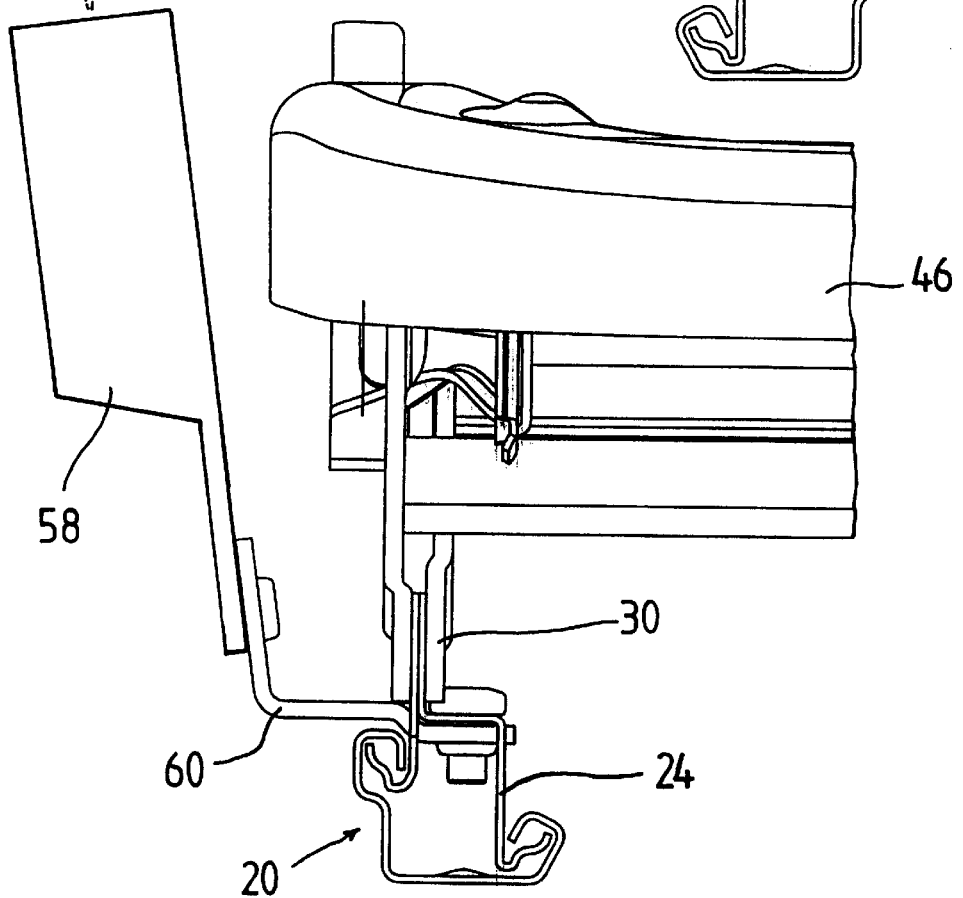

UNDERFRAME OF A MOTOR VEHICLE SEAT

The invention relates to a seat underframe of a motor vehicle seat according to the generic part of Claim 1.

FIELD OF THE INVENTION

Motor vehicle seats of this type are generally equipped with a safety belt, which, from the state of the art, consists of a lap belt and a shoulder belt. The two run together in a v-shaped manner, conjoining in a plug-in part which can be inserted into a belt. The other end of the lap belt is, in a preferred embodiment, secured to the motor vehicle seat itself. The other end of the shoulder belt is usually allocated to the car body, although it may otherwise be attached to the back rest in the case of what is known as an integral moulded seat.

BACKGROUND OF THE INVENTION

In the case of motor vehicle seats, there is a growing tendency to equip the seat base with height adjustability with respect to the seat travel device for longitudinal adjustments consisting of two pairs of runners. In the case of a seat underframe of the above-mentioned kind, the height adjustment device has rear rockers, namely a left-hand and a right-hand rear rocker. They support the seat base in its posterior area. The seat base must also be supported in its front area. It is also possible to provide rockers, namely front rockers, which are nevertheless devices of different construction, such as, for example, curved guide rails for axle pins on the front edge of the seat, etc.

A high level of safety is required of seat underframes, in particular, the safety belt must be anchored to them in such a fashion that the entire vehicle seat is capable of withstanding the loads which it is subjected to during the prescribed test trials. The construction of the seat underframe must also be of such a type as to be of as low a total weight as possible, capable of being set up and mounted simply, in addition to being easily recyclable. The mounting points for the safety belt, especially for the lap belt, must be embodied and arranged in such a way that their configuration is serviceable on the one hand and that the components into which the forces released by an accident are to be induced, on the other hand, are able to absorb these forces well without having to be of heavy construction with dimensions which are too large, resulting in a weight that is too high.

This is where the invention starts. It is the task of the invention to further develop the seat underframe of the above-mentioned kind in such a way, that the safety belt, especially the lap belt of this safety belt, is positioned in such a fashion as to be not only convenient to the user but also capable of absorbing high forces arising in the course of an accident, the individual components being of reasonable dimensions.

SUMMARY OF THE INVENTION

Departing from the seat underframe of the above-mentioned kind, this problem is solved in the following manner, that the rocker of the seat runner located on the vehicle exterior side, is equipped with an area of attachment for the lap belt of the safety belt, situated between both rocker hinges of this rocker, nearer to the upper rocker hinge than to the lower rocker hinge.

According to the invention, it is therefore the free end of the lap belt which is caught up by the outer rocker located on the vehicle exterior side. There, an area of attachment is provided, at which the afore-mentioned end of the lap belt is arranged. This area of attachment is not located at the seat base and not at the seat runner, but within a specific position of the back rocker. Because of this, the area of attachment varies on the one hand only to an insignificant degree in the event of a height adjustment of the seat base, in any case to a degree distinctly less than that of a belt end stationarily affixed to a seat runner. On the other hand, however, the induced forces are to be handled in this connection in such a way that the individual components of the seat underframe which play a role in the transference of forces released by an accident, particularly the posterior rocker, may be given normal dimensions. Because the end of the lap belt does not act upon the upper end entirely, but consequently, upon the upper rocker hinge instead, the interplay of leverages is still favorable, and the posterior rocker can alter its shape under the influence of the forces released by an accident, its stability capable of being exploited to its full extent, without the seat base and a tie-bar joining both rockers in the upper area having to be embodied in an unnecessarily prominent, heavy fashion.

The invention thus presents a particularly favorable arrangement of the free end area of the lap belt. This arrangement represents a felicitous compromise between an easy-to-use configuration and a favourably high-stability configuration.

The area of attachment is generally embodied as an aperture. Through this aperture, a bolt, for example, is inserted, with which the suitably embodied free end of the lap belt engages, the bolt, for instance, penetrating the free end.

In a preferred embodiment, the area of attachment to be found on a dome-shaped bulge which is fashioned in such a way that it protrudes in the direction of the vehicle's exterior side. In particular, a molding is to be considered in this connection. Thanks to the dome-shaped bulge, the course of the lap belt is more convenient, as it runs from the seat essentially only in a downward direction, its course in any case now running without a component tending towards the middle of the seat. Due to the dome-shaped bulge, room for sufficient play in the course of the movement of the height adjustment is achieved.

In a particularly preferred embodiment of the invention the area of attachment for the free end of the lap belt is found in a distance from the upper rocker hinge smaller than one third of the distance between the two rocker hinges. The nearer the area of attachment to the upper rocker hinge, the more precisely the free belt end is pulled along in the course of adjustments to the height adjustment device, and also, the more strongly subject to loads the rear rocker and the remaining parts in the event of an accident will be. The position specified above comprises an especially advantageous solution.

In yet another preferred embodiment, the rocker on the vehicle exterior side is bent towards the center line of the vehicle in such a way that the upper rocker hinge is distinctly nearer to the center line of the vehicle than the lower rocker hinge. In this case, the difference amounts to several centimeters, e.g. 2 to 5 cm. In this manner it is possible that the runner pair on the vehicle exterior side be placed laterally so far outside that it is actually no longer to be found directly beneath the car seat. This results in more leg room. This also allows a more advantageous course for the lap belt. Furthermore, the runner pair on the vehicle exterior side is mounted to the area of the underbody structure where higher stability is available.

The conjoint middle piece of the safety belt, at which, in the event of an accident, even higher traction generally occurs than at the so far considered free end of the lap belt, can be directly caught up by the seat runner. In this case there is the added advantageous suggestion of mounting the belt catch directly on the seat runner of the runner pair found at the center line of the vehicle. In particular, a mounting in the form of an L-shaped angle presents itself in this connection. One leg of this angular mounting is joined to the seat runner. Onto the other leg, the belt catch is placed. In this embodiment, it is essentially only the runner pair and the L-shaped angle which are subjected to the stress of the forces of acceleration occurring in an accident.

However, the belt catch can also be attached to the rocker at the center line of the vehicle. This has the advantage, depending on the position of the belt catch along this rocker hinge, of the belt catch more or less following the movement of the seat base in the course of a height adjustment. The configuration of the belt catch in an upper area of the rocker at the center line of the vehicle in a manner corresponding to the arrangement of the rocker at the vehicle exterior side for the end of the lap belt is possible. Also in this case, the afore-mentioned advantages are to be found again. On the one hand, the belt catch remains in the proper, ready-for-use position, in essence independent of the adjustments of the height adjustment device. On the other hand, the forces occurring in an accident to be transferred are still controllable.

It is preferable for the rocker located at the center line of the vehicle to have lateral displacement towards the middle of the seat or towards the middle of the vehicle of an extent less than that of the rocker located at the vehicle exterior side. In this manner, the seat can be much better fitted to the available space between a vehicle's transmission housing running down its center line, and the lateral sills of the underbody structure.

Further advantages and characteristics of the invention derive from the other claims as well as the following description of a non-restrictive embodiment of the invention, which is illustrated further with regard to the drawing. This drawing shows in:

BRIEF DESCRIPTION OF THE DRAWINGS

FIG. 2: a top view of a seat underframe according to FIG. 1,

FIG. 3: a sectional drawing along the intersection line III—III in FIG. 1,

FIG. 4: a view along the intersection line IV—IV in FIG. 1 and,

Figure 1:
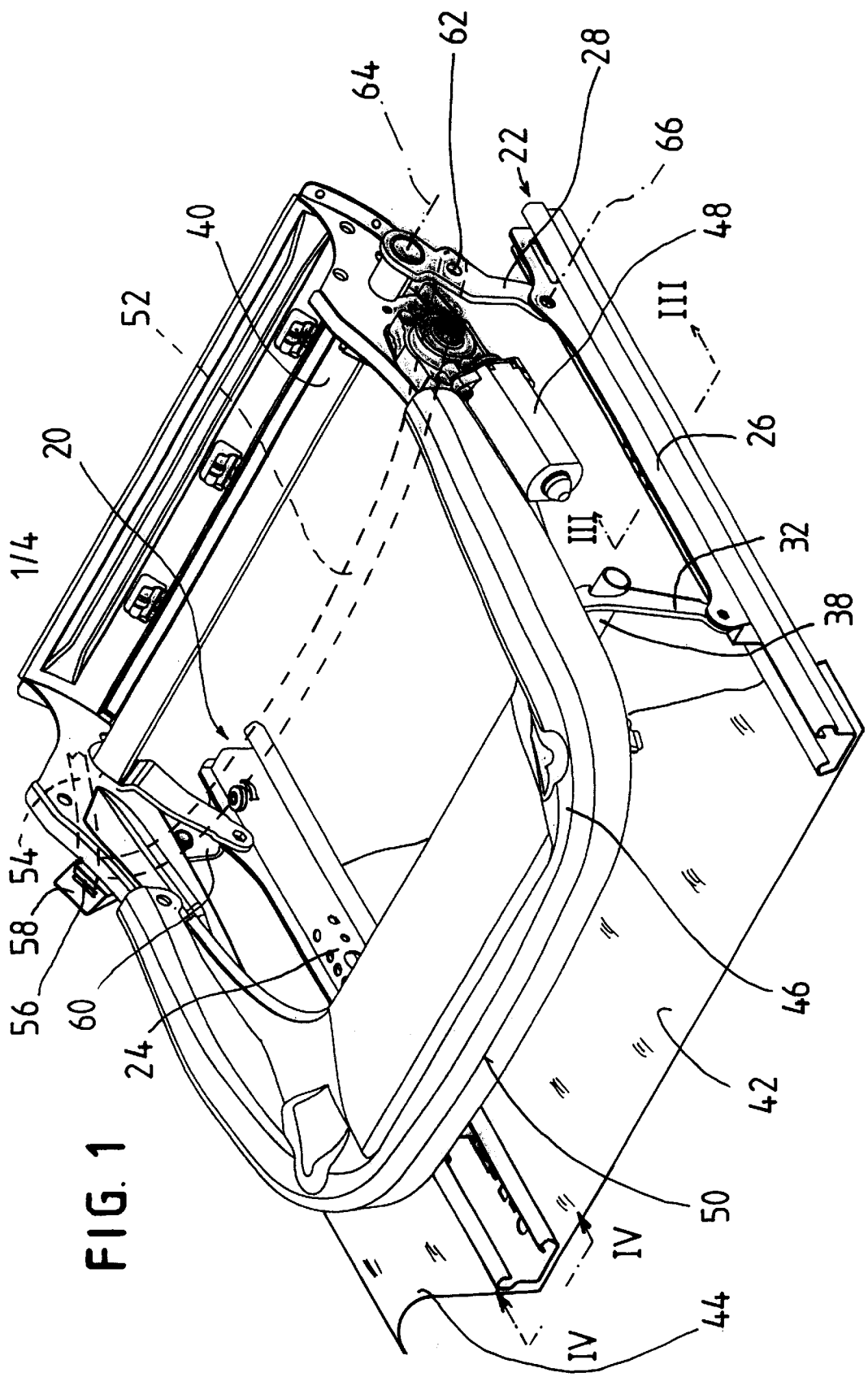
FIG. 1: a perspective view of the a seat underframe, which, besides the height adjustment of the seat base, which is embodied here with front rockers, also enables a height adjustment of the front edge of the seat.

For the moment, a seat underframe according to FIGS. 1 to 4 will be considered. The seat underframe according to FIG. 5 essentially corresponds with this first embodiment. In consequence, the only substantial differences it has, arise only in connection with the first embodiment. In this respect, the following description also concerns the major part of the seat underframe according to FIG. 5, so far as correspondences exist.

To the seat underframe belong a runner pair at the center line of the vehicle 20 and a runner pair 22 on the vehicle exterior side. In case one should wish to avoid a reference to the installation in the motor vehicle, it is possible to also designate the runner pair at the center line of the vehicle as the first runner pair and the runner pair on the vehicle exterior side also as the second runner pair. Both runner pairs, 20, 22 have a seat runner each, 24 or 26. On these, hinge areas for hinged connections with rockers 28 to 34 are embodied, namely, with a rear, on the vehicle exterior side located rocker 28, with a rear at the center line of the vehicle located rocker 30, both of which together, as posterior rocker, support a seat base 36 at its posterior region. Further front rockers 32 and 34. On each side of the seat, the respective seat runners 24 or 26 , the two rockers 28, 32 or 30, 34 and seat base 36 form a quadrilateral of hinges in a parallelogram-shaped array. Both parallelogram-shaped arrays of each side of the seat move synchronously, because the anterior rockers 32, 34 are joined by a tie-bar 38, precisely in the same manner as the posterior rockers 28, 30 are joined to each other by a cross-tube 40 in a rigid fashion. The quadrilateral arrays of hinges are each allocated with an adjustment device of familiar make not illustrated here, which performs the initial adjustment and securing in place of a hinge.

The floor rails of two runner pairs 20, 22 are attached to an underbody structure 42. A transmission housing 44, a bulge usually found running through the longitudinal center line of a passenger car is suggested. In this manner, the allocation of the runner pairs 20, 22, etc. with respect to the center line of the vehicle is made plain.

The seat base 36 is in a hinged connection at two opposing hinged areas which are parallel to the axis line running to the tie-bar 38 or to cross-tube 40, with a frame 46 which embodies the front edge of a seat. The said seat base extends in a forward direction essentially in a U-shape. By means of an electric motor 48 and a transmission coupled downstream, the angular position of this frame 46 with respect to the seat base 36 can be varied. In this manner, the height of a front edge 50, and consequently, in the finished vehicle seat, the seat front edge can be influenced.

In FIG. 1, a V-shaped safety belt is illustrated. It has a lap belt 52 and a shoulder belt 54, which, by means of a common plug-in part, interlock with each other in a familiar manner in the side next to the center line of the vehicle. This plug-in part is allocated a belt catch 58 which is attached to an upward and thus, from underbody structure 42 outwardly projecting leg of an L-shaped angular mount 60. The second leg of this angle-shaped angular mount 60 runs parallel to the underbody structure 42 and is attached in a rigid manner to the seat runner 24.

The other end of the lap belt 52 is permanently secured in place to an area of attachment 62 which, according to the invention, is located on the vehicle exterior side rear rocker 28, and is embodied as an aperture. This area of attachment 52 is located between an upper hinge axle 64 and a lower hinge axle 66, whereby it is distinctly nearer to the upper hinge axle 64 than to the lower hinge axle 66. In the embodiment according to FIG. 1, it is located at about one third of the distance between the two hinge axles 64, 66 from the upper hinge axle 64.

The rear, vehicle exterior side rocker 28 forms multiple angles. The location at which the upper hinge axle 64 goes through rocker 28 is displaced about 3 to 4 cm from the location at which the lower hinge axle 66 goes through. Because of this, the vehicle exterior side runner pair 22 is essentially no longer perpendicularly under the seat base 36 and its frame 48, as it particularly appears in FIG. 3. Around the area of attachment 62 runs the rear rocker 62 in a radial plane with respect to the two hinge axles 64, 66 which are parallel to each other, through there, a bolt or a screw runs, which is inserted through the area of attachment 62, which is embodied as an aperture, parallel to the hinge axles 64, 66. The rocker 28 is a part stamped out of sheet metal.

The front vehicle exterior side rocker 32 also forms an angle towards the middle of the seat, particularly as it appears in FIG. 2. In comparison, the posterior, at the center line of the vehicle located rocker 30 forms only a slight angle, with the displacement in the vicinity of 0, typically amounting to 1 cm. Because of this, the runner 20, which is located at the center line of the vehicle is essentially under the seat base 36, such as, for example, illustrated in FIG. 2 or FIG. 4. The displacement is in the direction of the seat's outer side, thus, in the direction of the center line of the vehicle.

Also evident in FIGS. 3 and 4, is the fact that two seat runners 24, 26 respectively are comprised of two individual sections. There is one section forming several angles, namely the partial section respectively positioned nearer to the other seat runner, while the exterior partial section has a simpler sectional shape, which can be described to be a crook or J-shape. In this manner, the traction is induced immediately into the rear rockers 28 or 30. Expressed in other words, the line of interlock essentially lies in alignment with the line of pull of the lap belt 52.

Figure 5:
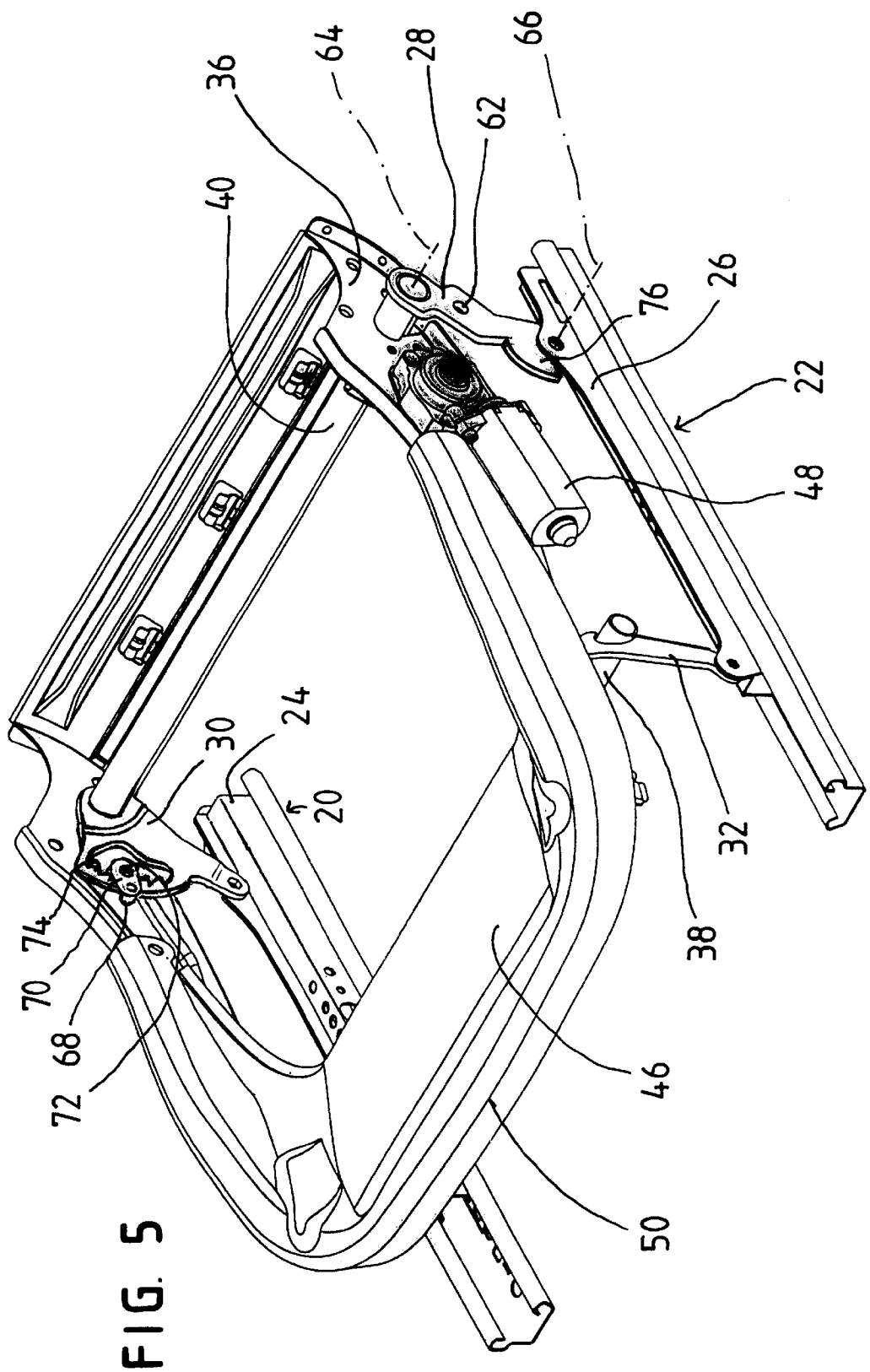
FIG. 5: a perspective drawing of a seat underframe similar to FIG. 1, but now, however, with a belt catch capable of being attached to a seat base.

In the embodiment according to FIG. 5, the L-shaped angular mount 60 is left out. The belt catch 60 is now hinged on an axle 68 which is embodied by a swivelling part 70. This has yet a second axle 72, by means of which it is hinged to seat base 36. The swivelling part 70 has an area of engagement which lies opposite a toothed quadrant 74, which is embodied in a recess of the rear vehicle exterior side rocker 30.

Pulling the belt catch 58 in the illustrated direction (see arrow), the swivelling part 70 is brought to swivel and thereby acts upon the toothed quadrant 74, whereby further movement is blocked. In this manner it is possible to arrange belt catch 58 on seat base 36 to be conveniently within reach. In the course of height adjustments of seat base 36, it moves along with same.

And finally, FIG. 5 illustrates a protrusion 76 on the otherwise identically constructed rear vehicle exterior rocker 28. This is embodied and shaped in such a way that, in the maximally permissible forward swivelling position of this rocker 28, thus, in the direction of the front rocker 32, it comes in contact with the surface of seat runner 26 and thereby blocks further swivelling action of the rocker 28 in the specified direction.

What is claimed is:

1. Seat underframe of a motor vehicle seat
   with a vehicle center line located and a vehicle exterior side located runner pair, which run parallel to each other and are arranged at a lateral distance to each other, and each of which is comprised of, respectively, a floor runner and a seat runner whereby the seat runner opposite the floor runner is equipped with the capability of longitudinal adjustment,
   with a height adjustment device having two rear rockers, where each runner pair is allocated to a rocker and each respective rocker is hinged at its lower end area with a lower rocker hinge at the seat runner,
   with a seat base which, in its rear area, is supported by the two rockers and is, respectively, in a hinged connection at an upper rocker hinge with the upper end area of the rockers and,
   with a belt catch of a safety belt (52,54), which is connected, directly or indirectly with the seat runner of the vehicle center line runner pair at the middle of the vehicle,
   characterized by the fact that, at the rocker of the seat runner of the vehicle exterior side runner pair, an area of attachment is provided for a lap belt of the safety belt, which is located between the two rocker joints of these rockers and which is nearer to the upper rocker joint than to the lower rocker joint.

2. Seat underframe according to claim 1, wherein, the vehicle exterior side rocker comprises a bulge for the area of attachment with the lap belt.

3. Seat underframe according to claim 1, wherein the area of attachment for the lap belt is located at a distance from the upper rocker hinge, which is smaller than one third of the distance between the two rocker hinges.

4. Seat underframe according to claim 1, wherein the vehicle exterior side rocker is bent towards the vehicle center line in such a way, that the upper rocker hinge of the vehicle center line is nearer than the lower rocker joint, such that the difference amounts from 2 to 5 cm.

5. Seat underframe according to claim 4, wherein the vehicle center line rocker has a lateral displacement, smaller than that of the vehicle exterior side rocker, and in the case of the vehicle center line rocker the upper hinge point is displaced towards the seat middle at a distance I cm less than the lower hinge point.

6. Seat underframe according to claim 1, wherein the belt catch is attached directly to the seat runner of the vehicle by means of an L-shaped angular mount, with one leg fastened to the seat runner and with the other leg fastened to the belt catch.

7. Seat underframe according to claim 6, characterized wherein said belt catch is attached to the rear vehicle center line rocker and attached at an area of attachment which is located between the middle of this rocker and the upper rocker hinge.

8. Seat underframe of a motor vehicle seat with a seat belt with a lap belt and a vehicle center line runner and a vehicle exterior side runner, which run parallel to each other and are arranged at a lateral distance to each other, and each of which is comprised respectively of, a floor runner and a seat runner whereby the seat runner opposite the floor runner is equipped with a longitudinal adjustment means having two rear rockers of a height adjustment device, where each runner pair is allocated to a rocker and each respective rocker is hinged at its lower end area with a lower rocker hinge at the seat runner with a seat base which, in its rear area, is supported by the two rockers and is, respectively, in a hinged connection at an upper rocker hinge with the upper end area of the rockers and, with a belt catch of said seat belt, which is associated with the seat runner of the vehicle center line runner pair at the middle of the vehicle, said rocker of the seat runner of the vehicle exterior side runner pair, an area of attachment is provided for the lap belt, which is located between the two rocker joints of said rockers and which is nearer to the upper rocker joint than to the lower rocker joint.

* * * * *